Dec. 16, 1941.    G. S. ALLIN    2,265,986
WHEELED TRACK REPLACEMENT UNIT FOR CRAWLER TYPE TRACTORS
Filed May 28, 1940    3 Sheets-Sheet 1

INVENTOR
GEORGE S. ALLIN
BY
Cook & Robinson
ATTORNEYS

Dec. 16, 1941.   G. S. ALLIN   2,265,986
WHEELED TRACK REPLACEMENT UNIT FOR CRAWLER TYPE TRACTORS
Filed May 28, 1940   3 Sheets-Sheet 2

INVENTOR
GEO. S. ALLIN
BY
Cook & Robinson
ATTORNEY

Dec. 16, 1941.     G. S. ALLIN     2,265,986
WHEELED TRACK REPLACEMENT UNIT FOR CRAWLER TYPE TRACTORS
Filed May 28, 1940     3 Sheets-Sheet 3
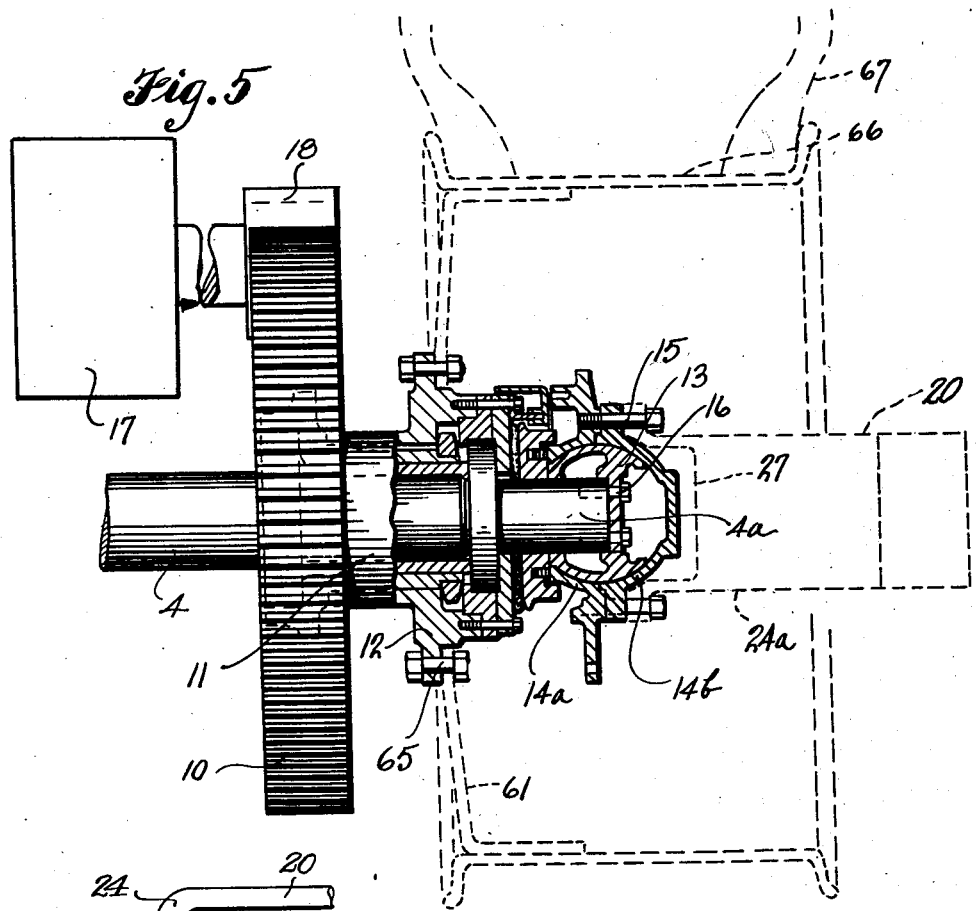
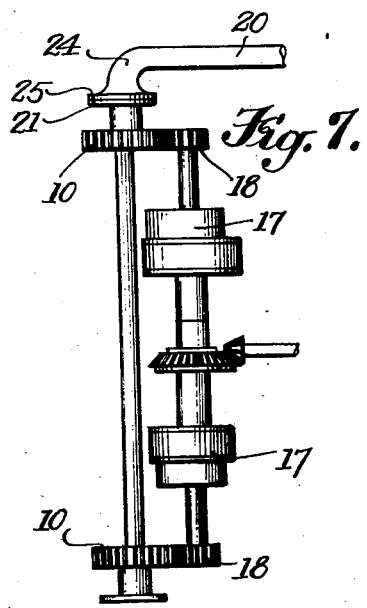
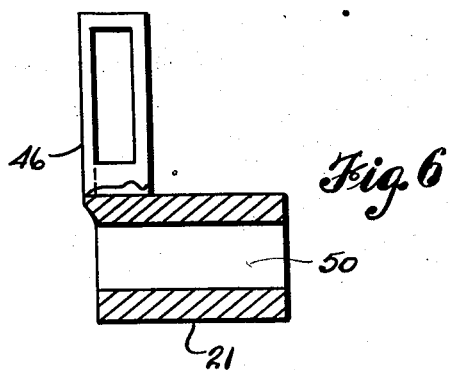
INVENTOR
GEORGE S. ALLIN
BY
Cook & Robinson
ATTORNEY Patented Dec. 16, 1941

2,265,986

UNITED STATES PATENT OFFICE 2,265,986

WHEELED TRACK REPLACEMENT UNIT FOR CRAWLER TYPE TRACTORS

George S. Allin, Seattle, Wash., assignor to Isaacson Iron Works, Seattle, Wash., a corporation of Washington Application May 28, 1940, Serial No. 337,647

14 Claims. (Cl. 180—9.2)

This invention relates to tractors of the "crawler" or "track laying" types, and it has for its principal object to provide parts that are adapted to replace the tracks and track mounting frames as now used on a certain well known types of tractors, for the purpose of converting the tractor from the crawler type to a wheel mounted vehicle. Furthermore, it is an object of the invention to so construct and arrange these replacement parts that they may be applied to the tractor for the above stated purpose without requiring any alteration or reconstruction of or the addition of other parts to the tractor upon the removal of the tracks and track frames therefrom.

It is also an object of the invention to so construct and arrange the present replacement parts that the same power transmission mechanism with which the tractor is originally equipped for driving the crawler tracks and the same declutching mechanism used for steering the tractor may be employed for driving and steering the vehicle when equipped with the present replacement parts including the ground wheels.

Explanatory to the objects to be attained by the present invention, it will here be stated that the most universally used tractors of the present day are of the crawler types, or what are also referred to as the "track laying" types. The advantages of this particular type over the older types of tractors having large, driven traction wheels at the rear and smaller steering and supporting wheels at the front, is well recognized and they are now to be found in use in practically all parts of the world and in most every branch of industry where heavy loads are to be moved.

In view of the foregoing, it has been the gist of this invention to provide what might be referred to as track replacement equipment, adapted to be used interchangeably with the crawler tracks, and their mounting means as now applied to certain well-known makes of tractors, whereby to readily convert the tractor into a wheel mounted, rubber tired road vehicle, capable of operation as a substantially increased speed of travel under ordinary load, and overcoming the legal objections to use of such tractors on paved highways.

It is also an object of this invention to provide novel replacement equipment of the kind above stated that may be easily and readily applied to the track frame mounting devices with which the tractor frame is already equipped, without alterations therein, and permitting the use of the same driving and steering equipment used for the control of the crawler treads, for the driving and steering of the vehicle in its wheel equipped state and for obtaining the increased rate of travel.

Other objects of the present invention reside in the details of construction and combination of parts of the replacement equipment and in the application and mode of use of the equipment on the tractor.

In accomplishing the above and other objects of the invention, I have provided the improved details of construction, the preferred forms of which are illustrated in the accompanying drawings, wherein—

Fig. 5 is a sectional detail, illustrating the application of the present equipment to the track frame pivot axle of the tractor, and the attachment of the main traction wheel to the hub provided for mounting the track driving sprocket wheel.

Fig. 6 is a sectional detail of the spring supported end of the wheel carrying frame, taken on line 6—6 in Fig. 2.

Fig. 7 is a plan view diagrammatically illustrating the present replacement unit in its connection with the driving and steering equipment of the tractor.

Figure 1:
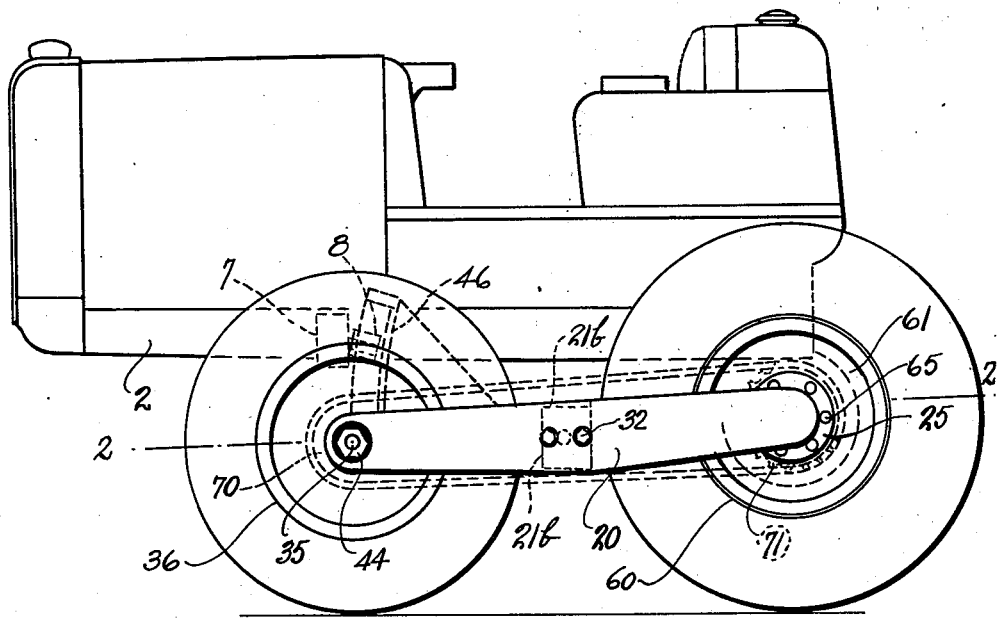
Fig. 1 is a side elevation of a tractor to which track replacement equipment has been applied in accordance with the present invention.

It is to be pointed out that while the replacement equipment as herein disclosed and illustrated is adapted to a tractor of a particular make, it is quite evident that, by slight modification in the equipment, it could be made applicable to other makes of the same general type. Also, in the drawings and description, only such parts as are directly concerned with the mounting and operation of the replacement equipment will be specifically referred to; the gist of the invention residing in the provision of a replacement equipment of the rubber wheel kind that is designed for and used in combination with the original track driving equipment of tractors of the declutching steering type.

Referring more in detail to the drawings—

Figure 3:
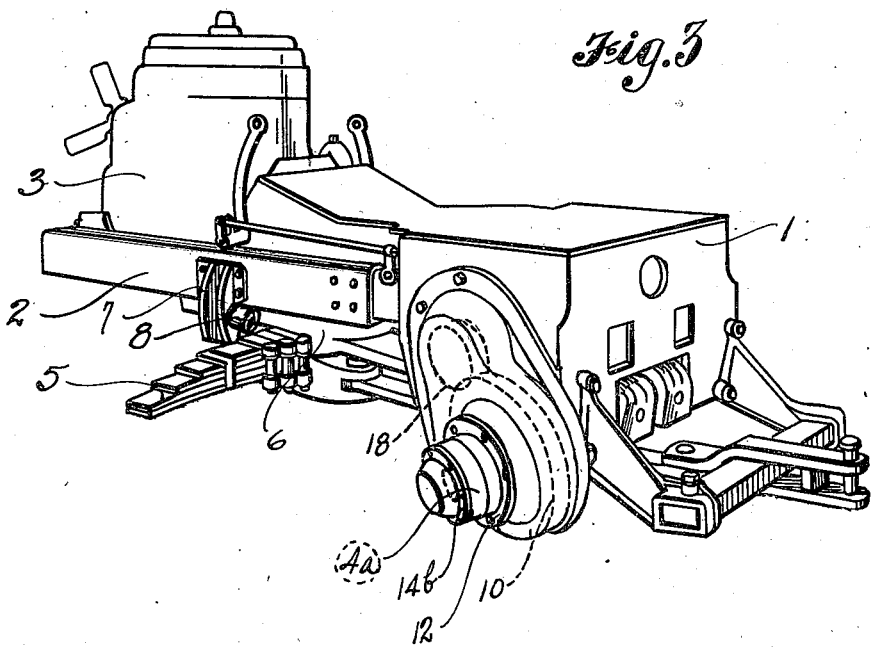
Fig. 3 is a perspective view of the tractor frame with the track frames and crawler treads removed preparatory to application of the replacement equipment.

The particular type of crawler track tractors which I have in mind in connection with the present invention, embodies a main frame structure, as illustrated in Fig. 3, which shows the frame stripped of its tracks and track frames, and its upper structure. In this particular structure there is a solid and substantially formed, rearwardly disposed housing 1, which contains the power transmission gearing and the declutching steering gear mechanism for the tracks. This housing is solidly fixed to a forwardly extending frame structure 2 by which the engine or prime mover, designated by numeral 3, is functionally mounted. Extending horizontally and transversely through the housing 1 is a shaft 4 of substantial proportions which has its opposite end portions 4a extended through and beyond the opposite side walls of the housing 1 to serve as pivot axles for mounting the track frames and track driving sprocket wheels with which the vehicle is originally equipped. This is known as the pivot axle.

Mounted beneath, and transversely of the frame structure 2 forwardly of the pivot axle, is a laminated spring 5 that is functionally mounted, medial of its ends, in a saddle 6, which is pivotally fixed in the frame 2. This is known as the equalizer spring. Opposite end portions of the spring 5 extend beyond the opposite sides of the main frame structure and in their normal use engage with the track frames to support and cushion the tractor frame and to relieve it of strain and twists. Also, attached to the opposite side beams of the frame 2 adjacent the equalizer spring are brackets 7 by which guide rollers 8 are mounted for engagement by vertical guides on the track frames to keep the tracks in horizontal alinement.

It will be understood also, more particularly by reference to Fig. 5, that the original equipment of the tractor includes, at each side of the tractor, a relatively large gear wheel 10 that is rotatably mounted on the corresponding end portion 4a of the pivot axle 4, through the mediacy of an outwardly extending hub 11 having a flange 12 to which a sprocket wheel is bolted for mounting and driving the crawler track at that side of the vehicle. Figs. 3 and 5 of the drawings show the driving gear wheel 10 and the wheel hub and flange, but with the track driving sprocket wheel removed and the wheel driving equipment of the present equipment affixed to the flange 12, as will presently be fully described.

Also, there is mounted on the end of the pivot axle 4a, a ball 13 forming a bearing about which a housing, comprising inner and outer semi-spherical sections 14a and 14b, respectively, is revolubly fitted. These sections are flanged and are secured together by bolts 15 extended through the flanges. The ball member 13 is secured to the axle end by bolts 16 extended through the outer wall of the ball and threaded into the end of the axle, as noted in Fig. 5. This ball and its housing serve in the usual operation of the tractor as a pivot support for the track frame, as will be understood by those familiar with the art.

Contained within the housing 1 is the transmission gearing through which the track treads are driven and the vehicle steered, and this includes, at each side, a clutch mechanism, designated in its entirety at 17 in Fig. 5, and a pinion 18 designed to be driven through the clutch mechanism and which is mounted in operative mesh with the gear wheel 10 at that side. It is to be understood that the clutch devices are separately controlled for steering purposes, as is well understood in this art, and further explanation of the control and mode of operation is not thought necessary to an understanding of the present invention.

The present replacement equipment embodied by this invention includes, for each side of the tractor, what may be termed a "swing frame" structure, designed to replace, or be used interchangeably with the track frame at that side. Each of these frames is made up of a longitudinal beam 20, an angle bracket 21 and a brace 22, to be arranged and assembled as will be understood best by reference to Figs. 2 and 4.

The beam 20 at each side of the vehicle is formed at its rearward end with a laterally inturned leg 24, terminating in a peripheral flange 25 comparable to the flanged outer section of the pivot ball housing and adapted, upon removal of the bolts 15 from the ball housing, to be applied flatly against the outside face of the ball housing flange and then to be secured thereto by the application of similar bolts through the flange 25 and ball housing flanges as they were originally applied. The end surface of the inturned leg 24 is hollowed out as at 27 to provide the clearance that will adapt it to be applied as above stated. The beam 20, when so attached to the tractor, extends forwardly, on a plane parallel with the side of the main frame and is adapted for oscillation in a vertical plane, as are the corresponding beams of the original track frames.

Affixed to the oscillating end of the beam 20 is the bracket 21. This comprises a horizontal leg 21a, that is spaced inwardly from and held parallel to the swinging end of the beam 20 by a leg 21b that is integral with and at a right angle to leg 21a, and which is secured at its outer end to beam 20 at approximately a medial point of the latter.

Figure 2:
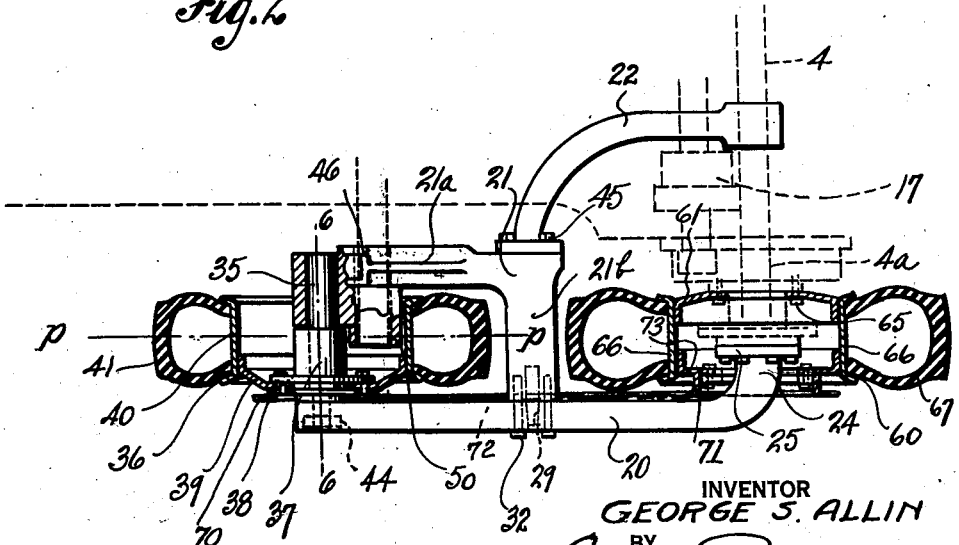
Fig. 2 is a horizontal sectional detail, taken on the line 2—2 in Fig. 1, particularly illustrating the mode of attachment of the replacement equipment to the tractor frame.
Figure 4:
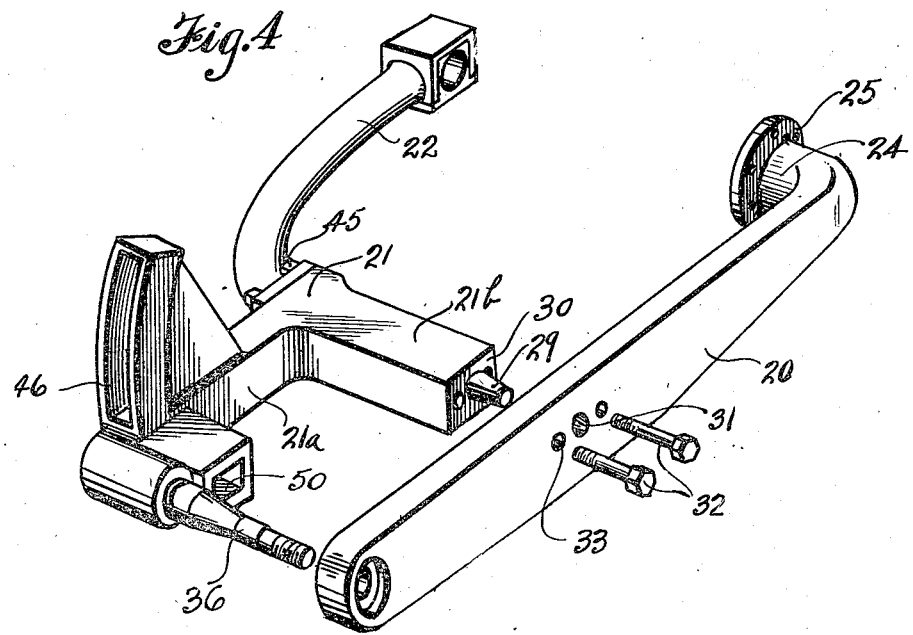
Fig. 4 is a perspective view of the wheel mounting frame members of the present equipment shown in a disconnected relationship for better illustration.

The means for connecting the leg 21b with beam 20 is disclosed best in Figs. 2 and 4, wherein it is shown that a tapered dowel 29 is fixed in the end of the leg 21b to extend beyond the flat, end surface 30 thereof and adapted to seat in a similarly tapered socket 31 in the beam 20. Also, a plurality of bolts 32 are extended through holes 33 in the beam and threaded into holes provided therefor in the end of the leg 21b to secure the parts rigidly together.

The leg 21a terminates at its forward end approximately even with the forward end of beam 20 and mounts a spindle 35 on which a ground wheel 36 is revolubly mounted; the wheel having a hub portion 37 revoluble on the spindle, and the hub having a flange 38 that mounts a wheel disk 39 equipped with a rim 40 which carries a pneumatic tire 41. It is to be observed by reference to Fig. 2, that the disk 39 is located well to the outside of the wheel, thus leaving the inside of the wheel body entirely unobstructed and open. Also the wheel rim 40 is substantially greater in diameter than hub 37, leaving an annular space between the hub and rim which opens toward the tractor frame.

It will be observed also, in Fig. 2, that the spindle 35 extends through a hole in the forward end of beam 20 and is secured by the application of a nut 44 to the spindle end.

To add rigidity to the structure and also to hold the swing frame against tilting, the brace bar 22 is affixed solidly to the base end of bracket 21 by bolts as at 45, and extends therefrom in an inwardly and rearwardly curved direction, and is pivotally mounted on the pivot axle 4 at a point close to the longitudinal axial center of the vehicle as noted in Fig. 2.

Formed through the forward end portion of the arm 21a of the bracket member 21 is a socket 10 providing a bearing surface or seat 50 upon which the end portion of the spring 5 at that side is engaged to yieldingly support the forward end of the vehicle. Also, on the forward end of the leg 21a of bracket 21 is an arcuate, upwardly directed guide bar 46 channeled lengthwise to receive the guide roller 8 therein to retain the swing frame in alinement with the main frame.

A special feature of the present arrangement is noted in the extent to which the end portion of the equalizer spring 5 projects into the interior of the wheel 41. It is to be pointed out that the socket or bearing surface 50 is extended laterally outward from the arm 21a to the medial plane of the wheel tire, or what might better be described as the plane of the ground contact line of the wheel; this plane being designated by line p—p in Fig. 2, and the end of the spring 5 engages this seat in this plane so as to apply the weight of the tractor as sustained by the spring, near the wheel center, thus to overcome tendency of outward or inward deflection of the swing frame and wheels.

Aside from the front wheel 36, the present replacement unit also is equipped with a rear wheel or traction and driving wheel 60. This is mounted for rotation about the pivot axle 4a and it comprises a wheel mounting disk 61 that is fitted to the outside of the wheel hub flange 12 and fixed thereto by bolts 65 applied to the same holes of the hub that are used for the reception of bolts in the securement of the tread driving sprocket wheel. The wheel disk carries a tire mounting rim 66 and this mounts the pneumatic tire 67. Thus, the same means as used for driving the crawler treads of the tractor may be utilized in this arrangement of parts for driving the traction wheels 60.

With the replacement equipment so constructed, and applied to the tractor, it is apparent that by using a rear wheel 60 of a diameter substantially increased over that of the tread driving sprocket originally used, the speed of travel of the vehicle may be increased accordingly.

In order to afford better facilities for steering, especially in soft ground, and also to add driving traction to the vehicle, sprocket wheels are applied and fixed to the hubs of the wheels 36 and 60 as designated at 70 and 71 and a sprocket chain belt 72 applied about the sprocket wheels to cause both to be power driven. The sprocket wheel 70 is fixed to the outside of the hub flange 38, overlying the wheel disk, by means of the bolts which secure the disk to the hub flange. The sprocket wheel 71 preferably would be bolted to a disk 73 which in turn would be welded in the outer end of the wheel rim 66, as noted in Fig. 2.

With the attachment or replacement equipment applied to the vehicle as illustrated in Figs. 1 and 2, it will be understood that steering of the vehicle will be effected in the same manner as when the tractor was equipped with the crawler treads, and it will be understood further that by the use of rubber tires equipped with proper traction treads, the vehicle will be serviceable and suitable for operation on any ground surface and yet when operated on paved highways, will not be detrimental thereto.

Should it be desired to reconvert the tractor to its original state; that is, with its crawler treads, the replacement mechanism may be removed merely by disconnection of the rear end of the beam 20 from the ball housing 14 by removal of its attaching bolts and detachment from the swing frame brace 22 by removal of the bolts 45.

The bracket 22 is then disconnected and this permits the removal of the swing frame from the tractor. The wheel 60 is then dismounted by removal of bolts from the wheel disk which attach it to the hub flange 12. The original track frames may then be applied without requiring any alteration or replacement of other parts on the tractor.

It is apparent that equipment of this character may be easily and readily applied or removed; that when applied, it converts the tractor into a wheel equipped vehicle capable of relative high speed and desirable particularly for long haul operations.

Having thus described my invention, what I claim as new therein and desire to secure by Letters Patent is—

1. A track replacement unit for tractors of that type characterized by having a transverse pivot axle with opposite end portions extended at opposite sides of the tractor frame for mounting crawler track frames, and an equalizer spring mounted in the tractor frame with ends extended to opposite sides of the tractor for support by the crawler track frames; said replacement unit comprising a swing frame structure adapted to be mounted for oscillating movement on one end portion of the transverse axle to extend along the tractor frame at that side for the support thereby of the corresponding end of the equalizer spring, a ground wheel mounted by the oscillating end of the said swing frame, and a ground wheel adapted to revolve about the extended end portion of the pivot axle and means for driving the last mentioned wheel.

2. A track replacement unit for tractors of that type characterized by having a transverse pivot axle with end portions extended at opposite sides of the tractor frame for the mounting of crawler track frames thereon, driven wheel hubs revoluble on the extended end portions of said axle and an equalizer spring mounted in the tractor frame with ends extended to opposite sides thereof for support on the said track frames; said replacement unit comprising a swing frame structure equipped for oscillating mounting on an end portion of the pivot axle, to extend along the tractor frame at that side for the support of the corresponding end of the equalizer spring, a ground traction wheel adapted to be applied for rotation about the extended end portion of the pivot axle and equipped for fixed mounting on the corresponding wheel hub and a ground wheel mounted by the swing frame at its oscillating end in tracking alignment with the first mentioned wheel to cooperate therewith in the functional support of the tractor.

3. A track replacement unit for tractors of that type characterized by having a transverse pivot axle with opposite end portions extended at opposite sides of the tractor frame for mounting of crawler track frames thereon, driven wheel hubs revoluble on the end portions of said pivot axle, an equalizer spring mounted in the tractor frame with ends extended to opposite sides of the tractor for support on the track frames, and a swing frame guide fixed on the tractor frame at each side adjacent the extended end of the equalizer spring; said replacement unit comprising a swing frame structure including a longitudinal beam, equipped at one end for oscillating mounting on one extended end portion of the pivot axle to extend along the tractor frame at that side, a bracket mounted on the oscillating end of the beam equipped with means for guided contact with the corresponding swing frame guide, a bearing surface in the bracket for the functional support of one end of the equalizer spring thereon, a spindle mounted by the bracket, a ground wheel revoluble on the spindle, and a ground wheel adapted for mounting about the pivot axle in tracking alinement with the first mentioned wheel and for fixed mounting on the driven gear hub at that side.

4. A track replacement unit for tractors of that type characterized by having a transverse pivot axle with ends extended beyond the sides of the tractor frame, an equalizer spring with ends extended to opposite sides of the frame, swing frame guides fixed to the tractor frame adjacent the extended ends of the equalizer spring, track driving gear wheels revoluble about the opposite end portions of the pivot axle, each having a hub flange for mounting a crawler track driving sprocket, a ball member fixed to each end of the pivot axle and a ball housing mounted pivotally on each ball member for the attachment of a swing frame beam; said replacement unit comprising a ground wheel adapted for rotation about one end portion of the pivot axle and having a body disk equipped for fixed mounting on the hub flange of the corresponding driven gear wheel, and a swing frame comprising a longitudinal beam adapted for fixed connection at one end to the corresponding ball housing, a bracket secured to the other end of the beam having a bearing surface adapted to support one end of the equalizer spring thereon and having a guideway for reception of the adjacent swing frame guide, a spindle fixed in the bracket and beam and a ground wheel revoluble on said spindle in tracking alinement with the first mentioned ground wheel.

5. A track replacement unit for tractors of the crawler type characterized by having a transverse pivot axle with ends extended beyond the sides of the tractor frame, an equalizer spring with ends extended to opposite sides of the tractor frame, swing frame guides fixed to the tractor frame at opposite sides adjacent the equalizer spring, a driven gear wheel revoluble about the extended end portion of the pivot axle at each side of the frame having a hub flange equipped for mounting a crawler track driving sprocket, a ball member fixed to the end of the pivot axle with a ball housing mounted thereon, and swing frame braces pivoted on the pivot axle and extended to opposite sides of the tractor; said replacement unit comprising a ground traction wheel adapted for rotation about the pivot axle and having a body disk equipped for mounting on the said hub flange of the driven wheel at that side, a swing frame comprising a longitudinal beam adapted for fixed connection to the ball housing at that side, a bracket secured to the other end of the beam to supportingly engage the equalizer spring at that side and equipped for securement to the swing frame brace at that side, and having a guideway for reception of the corresponding swing frame guide, a spindle fixed in the bracket and beam, a ground wheel revoluble on the spindle, and a driving connection between the wheels whereby they will be rotated in unison.

6. A track replacement unit for tractors of that type characterized by having a transverse axle with opposite end portions extended to opposite sides of the tractor frame for mounting the crawler track frames, a driven wheel hub revoluble on each extended end portion of said axle, and an equalizer spring with ends extended to opposite sides of the tractor frame for support on the track frames; said replacement unit comprising a swing frame structure adapted for mounting on an extended end portion of the pivot axle to extend along the tractor frame at that side of the tractor, a ground wheel equipped for mounting on the driven hub at that side of the tractor, another ground wheel mounted by the oscillating end of the swing frame; said swing frame having a bearing surface located within the plane of the ground contact line of the wheel and on which bearing surface the end of the equalizer spring at that side is engaged.

7. A tractor having a prime mover, a transverse pivot axle with end portions extended to opposite sides of the tractor frame, traction wheels mounted to revolve about the end portions of the pivot axle, driving connections between the prime mover and said traction wheels at each side of the tractor, including independently controlled clutches through which steering and propulsion of the tractor is effected, swing frames mounted on the end portions of the pivot axle and extended along opposite sides of the tractor, means resiliently supporting the tractor frame from the oscillating ends of the swing frames, and traction wheels mounted by the oscillating ends of the swing frames.

8. A tractor as recited in claim 7 wherein there is a driving connection between the ground wheels at the same side of the tractor whereby in steering and in propulsion, they operate in unison.

9. A tractor having a frame structure, a transverse pivot axle mounted in the frame structure and extended to opposite sides thereof, swing frames mounted on the pivot axle and extending along opposite sides of the tractor frame, ground wheels mounted to rotate about the pivot axle at opposite sides of the tractor, ground wheels mounted by the swing frames in tracking alinement with the first mentioned wheels and resilient supports extended from the tractor frame at opposite sides and each engaging the corresponding swing frames in the vertical plane of the line of ground contact by the wheels at that side.

10. A tractor having a frame structure, a transverse pivot axle mounted in the frame, swing frames mounted on the pivot axle and extending along opposite sides of the tractor frame, driven ground wheels mounted on the pivot axle at opposite sides of the tractor, ground wheels mounted by the swinging ends of the swing frames in tracking alinement with the first mentioned wheels and an equalizer spring mounted in the tractor frame and having opposite ends extended to opposite sides of the tractor and supportingly engaged with the corresponding swing frames in the vertical plane of the line of ground contact of the alined wheels and within the wheel periphery.

11. In a track replacement unit for track laying tractors of the character described, a swing frame structure equipped for removable mounting on an end portion of a tractor supporting pivot axle, a wheel spindle mounted at the swinging end of said frame structure, and a ground wheel revolubly mounted on the spindle and having an inwardly opening wheel body; said swing frame structure being formed with a bearing surface, for the support thereon of one end portion of the equalizer spring of the tractor, located in the plane of the ground contact line of the wheel and within the hollow body of the wheel.

12. In a track replacement unit for track laying tractors of the kind described: a swing frame structure equipped at one end with a socket for reception of the ball housing at the end of the tractor pivot axle and for fixed attachment to said ball housing, and having a wheel mounting spindle at its other end and a vertical guideway for containing a guide member on the tractor frame, a ground wheel revolubly mounted on the spindle and having an inwardly opening wheel body; said swing frame structure being formed with a bearing surface, located inside the wheel and through the plane of the ground contact line of the wheel for the support thereon of the end of the tractor equalizer spring.

13. A four wheeled tractor, having a prime mover, a transverse supporting axle, traction wheels rotatably mounted on the axle at opposite sides of the tractor, a driving gear for each of said traction wheels, a swing frame at each side of the tractor pivotally mounted at its rear end for vertical oscillation at its forward end, resilient means supporting the tractor from the forward ends of the swing frames, a ground wheel mounted at the forward end of each swing frame, and a steering means comprising individual clutch and brake means associated with the prime mover and with the driving gears for the said traction wheels, whereby to selectively alter the speed of the traction wheel at one side relative to that at the other side.

14. A four wheeled tractor, having a prime mover, a transverse supporting axle, traction wheels rotatably mounted by said axle at opposite sides of the tractor, a driving gear for each traction wheel, a swing frame at each side of the tractor, pivotally mounted for vertical movement at its forward end, resilient means supporting the tractor from the forward ends of the swing frames, a ground wheel mounted by the forward end of each swing frame in tracking alinement with the driven wheel at that side, driving means connecting the wheels at the same side to rotate in unison, and a steering means comprising an individual clutch and brake means associated with the prime mover and with the driving gears for the traction wheels whereby to selectively alter the driving speed of the wheels at one side relative to those at the other side.

GEORGE S. ALLIN.